United States Patent [19]

Cook et al.

[11] Patent Number: 4,931,971

[45] Date of Patent: Jun. 5, 1990

[54] PARTIAL DECODE SHIFTER/ROTATOR

[75] Inventors: Peter W. Cook, Mount Kisco, N.Y.; Robert K. Montoye, Austin, Tex.

[73] Assignee: International Business Machines Corporation, Armonk, N.Y.

[21] Appl. No.: 297,170

[22] Filed: Jan. 13, 1989

[51] Int. Cl.$^5$ ............................................... G06F 7/38
[52] U.S. Cl. .................................................. 364/715.08
[58] Field of Search ........................ 364/715.08, 715.01

[56] References Cited

U.S. PATENT DOCUMENTS

| 4,396,994 | 8/1983 | Kang et al. | 364/715.08 |
| 4,665,538 | 5/1987 | Machida | 364/715.08 |
| 4,831,571 | 5/1989 | Tokumaru | 364/715.08 |

Primary Examiner—Gary V. Harkcom
Assistant Examiner—Long T. Nguyen
Attorney, Agent, or Firm—Jack M. Arnold

[57] ABSTRACT

A data shifter/rotator which is comprised of two levels of s, where s is an integer >2, way switches. The outputs of the first level are connected to the corresponding inputs of the second level. There are first and second control words, with the first control word controlling the amount of the shift/rotation in the first level, and the second control word controlling the amount of the shift/rotation in the second level. The amount of the shift/rotation is determined by the position of the s way switches in each level, as selected by the respective control words.

6 Claims, 5 Drawing Sheets

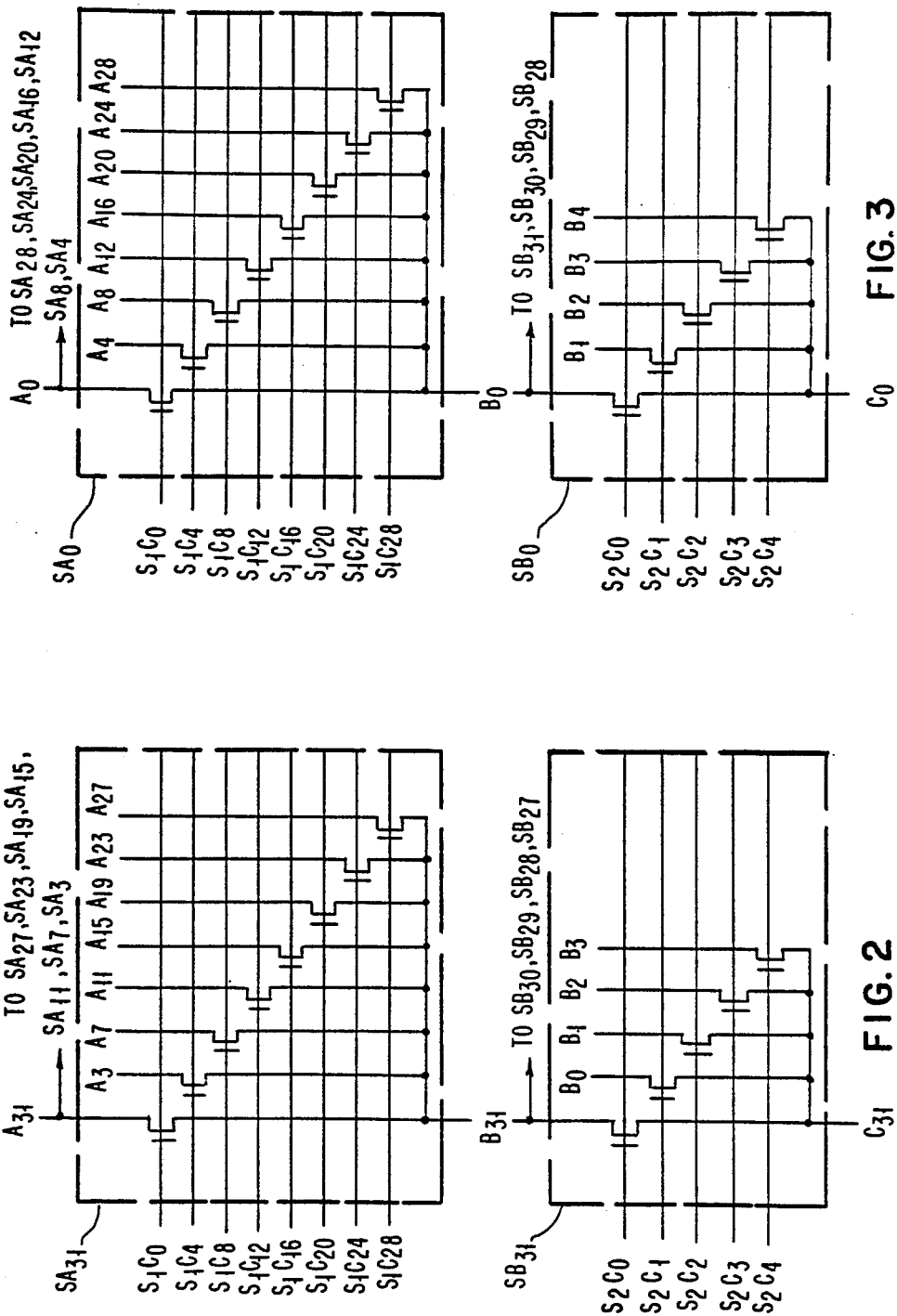

PARTIAL DECODE SHIFTER/ROTATOR

The invention is in the field of data processing, and more particularly is directed to a flow-through type shift/rotate circuit comprised of two levels, with each level including multiple data input switches controlled by multiple control signals.

It is well known in the data processing art to provide data processing systems with means for shifting or rotating (circular shifting) multi-bit binary data. Shifting of data is typically required in performing certain arithmetic operations such as multiplication or division, while rotation of data is typically used in data field manipulation operations such as field extraction or insertion.

Prior art shift/rotate apparatus are generally of two types, namely the flow-through type which normally permits a shift operation or a rotate operation to be performed within a single time period of the processing unit and the shift register type in which the number of time periods of the processing unit required to complete a shift or a rotate operation depends on the number of positions shifted or rotated. In general, high operating speed is desirable in data processing systems. Therefore, the flow-through type shift/rotate apparatus which has a shorter execution time is preferred over the shift register type in high performance data processing systems.

It is believed that formerly, flow-through type shift/rotate apparatus have not been used in data processing systems fabricated on a single integrated circuit ship, i.e., microprocessor and microcomputers, primarily because the chip area limitations of the integrated circuit technologies used did not permit practical implementation of the highly complex prior art flow-through shift/rotate circuits. Thus, the chip area limiatations dictated the use of the far simpler shift register type of shift/rotate circuit. Moreover, microprocessors and microcomputers have heretofore been designed primarily for relatively low performance applications. Therefore, the execution time of the shift register type of shift/rotate apparatus has been adequate for such applications.

Recent advances in integrated circuit technology in the area known as very large scale integration (VLSI) have made it possible to design microprocessors and microcomputer chips having a much greater number of components and capable of much higher performance. As such, the use of flow-through type shift/rotate circuit in such chips is now both desirable and practical. However, the chip area occupied by the shift/rotate circuit still has an important effect on the cost of the microprocessor or microcomputer in which it is used. In this respect, the prior art flow-through shift/rotate circuits are deficient in that they require a relatively large chip area for their implementation. Therefore, a need clearly exists for a flow-through type shift/rotate circuit which occupies a relatively small chip area when implemented in an integrated circuit.

Some prior art flow-through type shift/rotate circuits perform bidirectional (i.e., either right or left) shift or rotate operations using only a unidirectional shifter/rotator. A shift or a rotate operation in the opposite direction to that provided by the unidirectional shifter/rotator is performed by first reflecting (reversing the order of the bits) the data before passage through the shifter/rotator and reflecting the data again after passage through the shifter/rotator. Therefore, such prior art circuits require additional circuitry for performing the reflections on the data. One such prior art circuit uses a single data reflection circuit coupled to receive data from the unidirectional shifter/rotator and performs the shift or rotate operation in the opposite direction to that provided by the unidirectional shifter/rotator by making the data pass twice through both the shifter/rotator and the reflection circuit. From the standpoint of chip area, using a unidirectional shifter/rotator is advantageous because it occupies less chip area than a bidirectional shifter/rotator. However, in the case of the prior art circuits, the chip area savings derived from using a unidirectional shifter/rotator is more than cancelled by the addition of data reflection circuitry. Moreover, where the prior art circuit requires a double passage of the data, the execution time for a shift or rotate operation is also increased.

In another prior art flow-through type shift/rotate circuit, a bidirectional rotate circuit is combined with a vector mask generator and an appropritate gating network to provide a bidirectional shift/rotate circuit. For rotate operations, the mask generator is not used. However, for shift operations, the output of the mask generator controls the gating network to provide masking of the circularly shifted bits of the data. This latter circuit configuration is advantageous in that it can be adapted to provide both the arithmetic shift operation as well as the logical shift operation. However, prior art bidirectional rotate circuits require a relatively large chip area for their implementation, although the mask generator may be implemented in a relatively small chip area. Therefore, a bidirectional rotate circuit occupying a small chip to be used in conjunction with a mask generator would be desirable. In particular, it would be desirable to have a flow-through type circuit which provides bidirectional rotation of data using a unidirectional shifter/rotator but which requires neither reflection of the data nor multiple passes of the data through the circuit.

A number of patents are directed to decoding, shifting and/or rotating, each having certain advantages and disadvantages, as set forth below.

U.S. Pat. No. 4,281,401 to Redwine, discloses a shift register that decodes each half of the register simultaneously with the other half, thereby achieving a significant improvement in speed. The patent also discloses utilization of the transfer gates, and LSI and CMOS technology.

U.S. Pat. No. 4,571,510 to Seki, discloses the use of transfer gates in decoders to improve speed and reduce area.

U.S. Pat. No. 4,438,427 to Miura, discloses a method of decoding multi-bit digital signals. The environment is application to LSI and CMOS technology.

U.S. Pat. No. 4,429,374 to Tanimura, discloses a method of using partial coding and decoding to access memory arrays. The advantage of the invention is speed and reduced size.

U.S. Pat. No. 4,247,921 to Itoh, discloses a method and apparatus which disables half of the decoders on a chip. The advantages are reduced size and circuit stability.

U.S. Pat. No. 4,242,752 to Herkert, discloses a method and apparatus for generating cyclic check codes through partial coding and decoding. The advantage of the invention is speed.

U.S. Pat. No. 4,396,994 to Kang et al describes a flow-through type data shifting and rotating apparatus comprised of at least five vertical stages of shifting- /rotating a 32 bit word. The stage include 2 way switches to accomplish the shifting rotating which results in a speed of operation determined at least in part by the number of vertical stages.

According to the present invention a partial decode shifter/rotator is described which has enhanced speed of operation due to a reduction in the number of shift levels. Only two shift levels are utilized as a result of partial decoding, and s, where s is an integer >2, way switches are utilized rather than 2 way switches.

OBJECTS OF THE INVENTION

It is an object of the invention to provide an improved shifter/rotator.

It is a further object of the invention to provide an improved shifter/rotator which utilizes particl decoding for controlling the shifter/rotator.

It is another object of the invention to provide a partial decode shifter/rotator comprised of two levels, with each level including s, where s is an integer >2, way switches.

BRIEF DESCRIPTION OF THE DRAWINGS

FIG. 2 is a circuit diagram of switches $SA_{31}$ of the first level and $SB_{31}$ of the second of the partial decode shifter/rotator;

FIG. 3 is a circuit diagram of switches $SA_0$ of the first level and $SB_0$ of the second level of the partial decode shifter/rotator;

DISCLOSURE OF THE INVENTION

Figure 1:
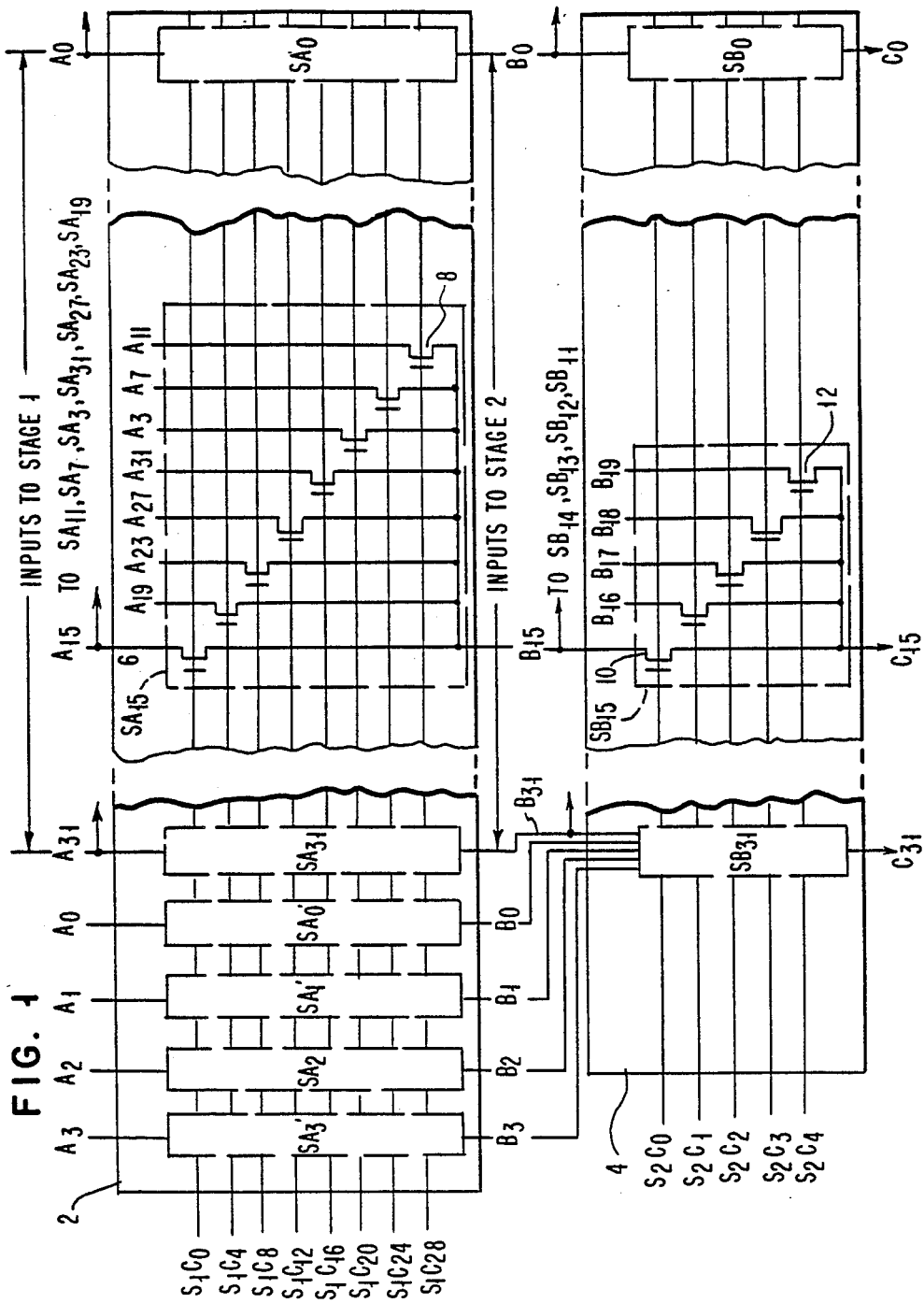
FIG. 1 is a block diagram of a two level partial decode shifter/rotator.

A partial decode shifter is divided into two levels of s, where s is an integer >2, way switches for shifting/rotating an N bit word a selected amount. The first level shifts/rotates the N bits under control of a first control signal, and the second level shifts/rotates the bits from the first level, under control of a second control word.

BEST MODE FOR CARRYING OUT THE INVENTION

A partial decode shifter/rotator mechanism for VLSI and MOS device is described below, in which partial decoding is utilized for increased speed of operation of the mechanism.

Shifting is an operation which maps an input word to a set of output positions given by the shift distance (sd), i.e., out (i)=in (i−sd) if (i−sd) is non-negative, and out (i)=0 if in (i−sd) is negative. Rotation on the other hand maps the input word to the outputs position MOD the number of bits, i.e., out (i)=in (i−sd MOD N) for an N bit word. An assumption is that the delay from the arrival of the shift distance to the generation of the output word is the critical path, although the disclosed techniques produce low delays when measured from input word to output word as well. Shifting is accomplished by fanout of the input data to the appropriate bit positions, and selection of the appropriate datum.

It is assumed that the shift distance is given in binary format and any delay incurred in alternate coding of this distance must be counted in the overall delay of the circuit. A method of partial decoding is described which allows simpler switching design with a reduction both in area and delay for shifting. Additionally, a circuit technique is described which results in area, density and speed similar to pass devices, and with nMOS-like testability.

In utilizing partial decoding, a shifter uses 2 (or more) shift stages. Each stage n can shift the data presented to it by a number of bit positions that is given by Sn×Bn, where Sn is the shift amount selected for the stage by the decoder and Bn is a "base" shift amount built into the physical structure of the stage. Sn will be restricted to a range of values (Ln through Hn, inclusively). Thus, for 2 stages, the total shift amount provided is (S1×B1)+(S2×B2). It is generally required that a shifter provide shift distances that include all possible integer multiples p of some shifter base amount B0, over a limited range of p (typically such that p×B0 is from 0 through W−1, where W is the width of the data being shifted). Such a shifter is "complete". The shifter is also termed "redundant" if a shift distance can be obtained with several distinct values for the set of amounts (S1, S2 (...)). For a shift distance of $2^w=W$, B0=1 shifting can be accomplished using w stages in series, each stage i shifting (0 ... 1)×$2^{(w-i)}$ with 2 control lines per stage. For the same shift distance, B0=1 shifting can be accomplished using w/2 stages, each stage i shifting (0 ... 3)×$2^{(w-2i)}$, with 4 control lines per stage. Again, B0=1 shifting can also be obtained in one stage shifting (0 ... (W−1)) and requiring W control lines. To minimize control and data lines, appropriate shift bases in each stage must be chosen. Since the decoding operations will either take place explicitly in the shifter (in a w stage shifter) or in the partial decoder, the delay corresponding to a unary (one shift distance per bit position) must exist; however, the load capacitances are reduced by partial (or full) decoding since the signals are computed locally and then fanned out. Therefore, there are certain advantages to decoding. Partial decoding (1< number of stages <w) allows overlap between the delay of each partial group of decoding.

FIG. 1 is a block diagram of a shifter/rotator according to the invention. The operation is described in the context of rotation, i.e. circular shifting, with the understanding that the principles of operation are applicable to straight shifting. The shifter/rotator shifts or rotates an input N-bit binary word by a total amount or increment determined by a plurality of control signals provided at the output of first and second decoders. The first and second decoders decode n, where n is an integer, scale factor signals to provide a first and second plurality of control signals, respectively, which specify the total amount of rotation. The first decoder decodes scale factor signals 1 through i, where i is an integer >2, scale factor signals to provide the first control signals which comprises a first plurality of control signals. The second decoder decodes scale factor signals (i+1) through n to provide the second control signal which comprises a second plurality of control signals. The shifter/rotator includes first and second N-bit switching levels for shifting the input N-bit binary word by the total amount. The first level shifts the input N-bit binary word by the first amount in response to the first control signal to provide a first N-bit binary word. The second level shifts the first N-bit word by the second amount in response to the second control signal to provide an output N-bit binary word which is the input N-bit binary word shifted by the total amount.

If, for example, the input N-bit binary word is 32 bits in length, each of the first and second switching levels include 32 switches controlled by the first and second control signals, respectively.

For a full rotate of the N-bits, the number of scale factors n is calculated as follows:

$$n = \log N \qquad (1)$$
$$= \log 32$$
$$n = 5$$

To choose i for optimum operation:

$$i \simeq n/2 \qquad (2)$$
$$i \simeq 5/2 = 2.5$$

Therefore, 2.5 is rounded up to the next highest integer which results in an i of 3.

The first decoder provides $2^{(n-i)}+1$ control signals, which is $2^{(5-3)}+1=2^2+1=5$.

The second decoder provides $2^i$ control signals, which is $2^3=8$.

It is a design choice relative to which switching level, the first or second level, the respective control signals, from the first or second decoder are applied. As a general rule, it is preferred to run the greater number of control signals to the first level as this results in a better VLSI layout.

Therefore, for the description that follows, the first switching level is described as having $2^i$ control inputs, that is 8; and the second switching level is described as having $2^{(n-i)}+1$ control inputs, that is 5. It follows that each of the switches in the first switching level has 8 data inputs which are selected by 8 control inputs. Each switch in the second switching level has 5 data inputs which are selected by 5 control inputs. The data selected is determined by the amount of shift or rotate required. This is described in more detail below.

Refer now to FIG. 1, which illustrates a first switching level 2 and a second switching level 4. The switching level 2 receives a 32 bit data input word at inputs $A_0$–$A_{31}$ which inputs are applied to first inputs of switches $SA_0$–$SA_{31}$, respectively. Each such switch receives 7 other data bits to select from, with each such bit being consecutively displaced 4 higher order bit positions from the first input bit position and from one another. This is seen with respect to switch $SA_{15}$ which receives bit $A_{15}$ at its first input and bits $A_{19}$, $A_{23}$, $A_{27}$, $A_{31}$, $A_3$, $A_7$ and $A_{11}$ at the other inputs. $A_{15}$ is also applied to 7 lower order switches, with each such switch being consecutively displace 4 low order bit positions from $SA_{15}$, that is $SA_{11}$, $SA_7$, $SA_3$, $SA_{31}$, $SA_{27}$, $SA_{23}$ and $SA_{19}$.

The first switching level receives a first set of 8 control signals from a first decoder (FIG. 6) which decodes the (i+1) through n scale factor signals, i.e., $S_2$, $S_3$ and $S_4$ to provide the 8 control signals $S_1C_0$–$S_1C_{28}$ for selecting the data inputs which provides the selected shift or rotate. The switches are shown as MOS transistors, however it is to be appreciated that other switching devices such as bipolar transistors, relays, photoconductors controlled by LED's, or the like may be utilized in the practice of the invention. This may be seen with respect to $SA_{15}$, where it is seen that $SA_{15}$ is comprised of 8 NMOS transistors which have their respective source electrodes connected to the respective bit position inputs, and the respective drain electrodes connected together to form the $B_{15}$ bit position output from $SA_{15}$. Only one NMOS transistor at a time is turned on as selected by the control signal applied to their respective gate electrodes. For example, if there is to be no shift or rotate in level 1, control signal $S_1C_0$ is on, and transistor 6 is turned on, and bit $A_{15}$ is provided as the $B_{15}$ output. Each successive control signal when on, turns on the transistor it controls to select the appropriate shift or rotate. When a shift or rotate of 28 is selected, control signal $S_1C_{28}$ is on, and transistor 8 is turned on and bit $A_{11}$ is provided as the $B_{15}$ output, which is indicative of a shift or rotate of 28 from level 1.

Each switch position $SA_0$–$SA_{31}$ has the same control signal selected from $S_1C_0$–$S_1C_{28}$ on at the same time, such that the same degree of shift or rotate occurs at each bit position.

The first switching level 2 also includes switches $SA_0'$, $SA_1'$, $SA_2'$ and $SA_3'$ which are dummy switches of $SA_0$, $SA_1$, $SA_2$ and $SA_3$, respectively. They are utilized to reduce the wire lengths when connecting the outputs $B_0$, $B_1$, $B_2$, $B_3$ to the high order bit positions of level 2. The invention is operable with or without these dummy switches.

It is seen that level 2 provides a first N-bit binary data word at its output $B_0$–$B_{31}$ which is the input N-bit binary word $A_0$–$A_{31}$ shifted or rotated by an amount determined by the first set of control signals $S_1C_0$–$S_1C_{28}$. The shift or rotate from level 1 is from 0–28 in crements of 4.

The second switching level 4 receives the 32 bit first N-bit binary data word at its inputs $B_0$–$B_{31}$, which are applied to first input switches $SB_0$–$SB_{31}$, respectively. Each such switch receives 4 other data bits of select from, with each such bit being consecutively displaced 1 higher order bit position from the first input bit position and from one another. This is seen with respect to switch $SB_{15}$ which receives bit $B_{15}$ at its first input and bits $B_{16}$, $B_{17}$, $B_{18}$, and $B_{19}$ at the other inputs. $B_{15}$ is also applied to 4 lower order switches, with each such switch being consecutively displaced 4 low order bit positions from $SB_{15}$.

The second switching level 4 receives a second set of 5 control signals from a second decoder (FIG. 7) which decodes the first through i scale factor signals, i.e., $S_0$ and $S_1$ to provide 5 control signals $S_2C_0$–$S_2C_4$ for selecting the data inputs which provides the selected shift or rotate. This may be seen with respect to $SB_{15}$, where it is seen that $SB_{15}$ is comprised of 5 NMOS transistors which have their respective source electrodes connected to the respective bit position inputs, and the respective drain electrodes connected together to form the $C_{15}$ bit position output from $SB_{15}$. Only one NMOS transistor at a time is turned on as selected by the control signal applied to their respective gate electrodes. For example, if there is not shift or rotate in level 2, control signal $S_2C_0$ is on, and transistor 10 is turned on, and bit $B_{15}$ is provided as the $C_{15}$ output. Each successive control signal when on, turns on the transistor it controls to select the appropriate shift or rotate. When a shift or rotate of 4 is selected, control signal $S_2C_4$ is on, and transistor 12 is turned on and bit $B_{19}$ is provided as the $C_{15}$ output, which is indicative of a shift or rotate of 4 from level 2.

Each switch position $SB_0$–$SB_{31}$ has the same control signal selected from $S_2C_0$–$S_2C_4$ on at the same time, such that the same degree of shift or rotate occurs at each bit position.

Switch $SB_{31}$ receives as inputs bits $B_0$, $B_1$, $B_2$ and $B_3$ from dummy switches $SA_0'$, $SA_1'$, $SA_2'$ and $SA_3'$. As stated above, this is to save wiring distance. However, it is to be appreciated that these bits could instead have been provided from switches $SA_0$, $SA_1$, $SA_2$, $SA_3$ and $SA_4$, respectively, if wiring distances are not of concern.

It is seen that the second switching level 4 provides a second N-bit binary data word at its output $C_0$-$C_{31}$ which is the first N-bit binary data word $B_0$-$B_{31}$ shifted or rotated an amount determined by the second set of control signals $S_2C_0$-$S_2C_4$. The shift or rotate from level 2 is from 0-4 in increments of 1.

Alternatively, it may be stated that the second switching level 4 provides an output N-bit binary data word at its output $C_0$-$C_{31}$ which is the input N-bit binary word $A_0$-$A_{31}$ shifted or rotated an amount determined by the first and second sets of control signals. The shift or rotate is from 0-32, that is the sum of the shift or rotate from the first and second levels.

If the total shift or rotate for the circuit is to be 0, $S_1C_0$ and $S_2C_0$ would be on to control first and second switching levels 2 and 4, respectively. If the total shift or rotate is to be 1, $S_1C_0$ and $S_2C_1$ would be on and so on up to a shift to 32 where $S_1C_{28}$ and $S_2C_4$ would be on to control first and second switching levels 2 and 4, respectively.

FIG. 2 illustrates in detail the switches $SA_{31}$ and $SB_{31}$ of first and second switching levels 2 and 4, respectively. It is seen that the switch configuration is identical to that of switches $SA_{15}$ and $SB_{15}$, as shown in FIG. 1. Input bit $A_{31}$ is shown as the first input to $SA_{31}$, as well as being connected as input to switches $SA_{27}$, $SA_{23}$, $SA_{19}$, $SA_{15}$, $SA_{11}$, $SA_7$, and $SA_3$. Output bit $B_{31}$ from $SA_{31}$ is shown as the first input to $SB_{31}$, as well as being connected as input to switches $SB_{30}$, $SB_{29}$, $SB_{28}$, and $SB_{27}$. As previously stated, the bits $B_0$, $B_1$, $B_2$ and $B_3$ applied to the other inputs of $SB_{31}$ may be provided from switches $SA_0$, $SA_1$, $SA_2$, and $SA_3$ or dummy switches $SA_0'$, $SA_1'$, $SA_2'$, and $SA_3'$, respectively. The switches $SA_{31}$ and $SB_{31}$ operate in the same manner as described relative to $SA_{15}$ and $SB_{15}$.

FIG. 3 illustrates in detail the switches $SA_0$ and $SB_0$ of first and second switching levels 2 and 4, respectively. It is seen that the switch configuratin is identical to that of switches $SA_{15}$ and $SB_{15}$, as shown in FIG. 1. Input bit $A_0$ is shown as the first input to $SA_0$, as well as being connected as input to switches $SA_{28}$, $SA_{24}$, $SA_{20}$, $SA_{16}$, $SA_{12}$, $SA_8$, and $SA_4$. Output bits $B_0$ from $SA_0$ is shown as the first input to $SB_0$, as well as being connected as input to switches $SB_{31}$, $SB_{30}$, $SB_{29}$, and $SB_{28}$. The bits $B_1$, $B_2$, $B_3$ and $B_4$ applied to the other inputs of $SB_0$ are provided from the outputs of $SA_1$, $SA_2$, $SA_3$, and $SA_4$, respectively.

All of the intermediate switches, i.e. $SA_1$-$SB_{30}$ in level 1 and $SB_1$-$SB_{30}$ in level 2, are in a similar configuration.

Figure 4:
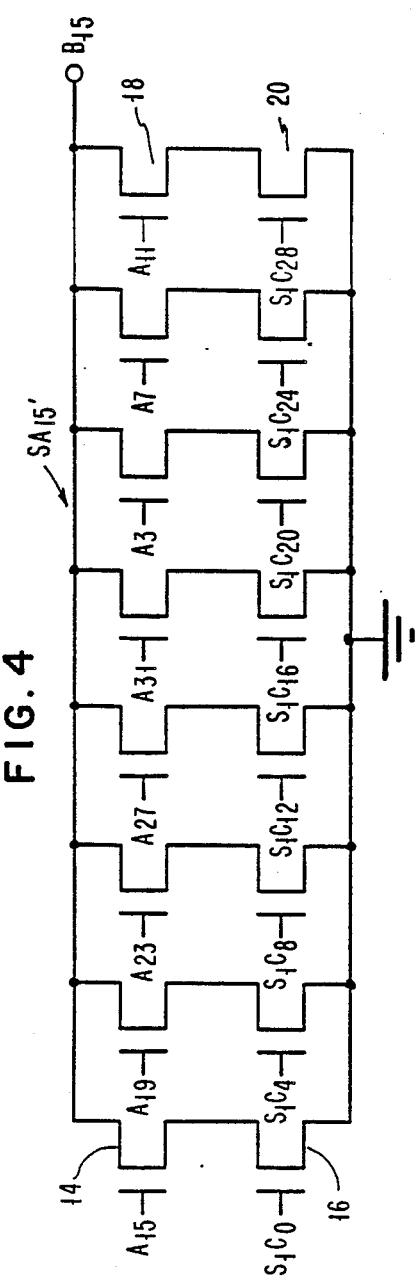
FIGS. 4 and 5 are circuit diagrams of first and second level switches, respectively.
Figure 5:
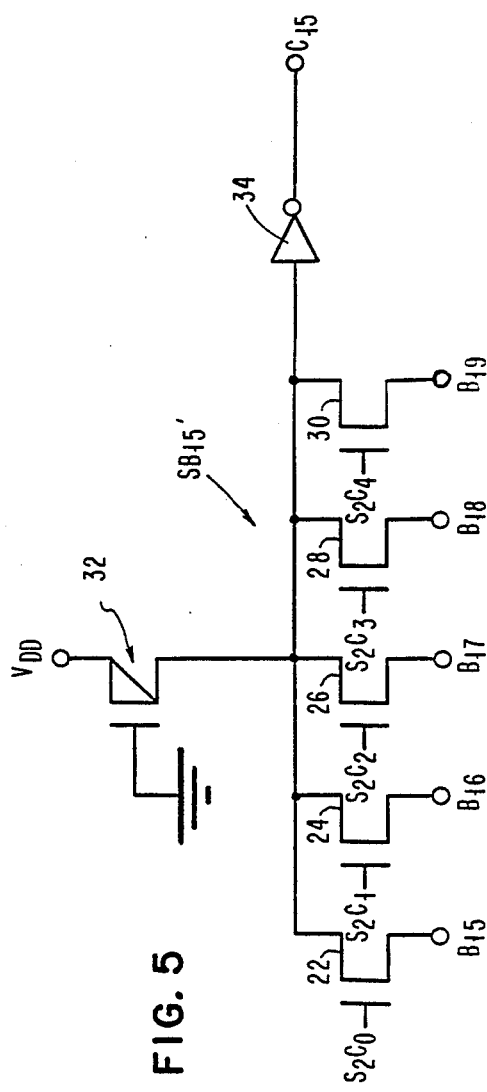

FIGS. 4 and 5 illustrate alternative configurations of the switches utilized in the first and second switching levels 2 and 4, respectively, of FIG. 1. Bit position 15 is chosen as representative, and alternative forms of $SA_{15}$ of level 1 and $SB_{15}$ of level 2 are shown. A switch $SA_{15}'$ of level 1 is shown in FIG. 4, with all other switches in level 2 being configured in a like manner. A switch $SB_{15}'$ of level 2 is shown in FIG. 5, with all other switches in level 2 being configured in a like manner.

In FIG. 4, a stacked transistor configuration of NMOS transistors is illustrated. In a given stack of 2 transistors, the first is controlled by a data signal applied to the gate electrode and the second is controlled by a control signal applied to the gate electrode. Accordingly, the data signal and control signal for a given stack must be concurrently applied to turn both transistors in the stack on. For example, if there is a shift or rotate of 0 in first switching level 2, $S_1C_0$ is on, and if $A_{15}$ is on, transistors 14 and 16 are turned on and a ground potential is applied to output $B_{15}$. Any other selected shift or rotate is accomplished in a like manner. For example, if first switching level 2 is to provide a shift or rotate of 28, $S_1C_{28}$ is on, and if $A_{11}$ is on transistors 18 and 20 are turned on and a ground potential is applied to output $B_{15}$. The time at which the ground potential is applied to $B_{15}$ is a function of the respective control signals.

In FIG. 5, $SB_{15}'$ is illustrated with output $B_{15}$ from $SA_{15}'$ being applied to the drain electrode of a NMOS transistor 22. Data bit inputs $B_{16}$, $B_{17}$, $B_{18}$ and $B_{19}$ are applied to the drain electrodes of transistors 24, 26, 28 and 30, respectively. The control signals applied to the respective gate electrodes determines which data bit is selected. A PMOS transistor 32 has its source electrode connected to $V_{DD}$ and its gate electrode is connected to ground such that transistor 32 is normally biased such that the positive potential $V_{DD}$ is applied to the input of an inverter 34 which provides a ground or zero potential output at $C_{15}$. If a shift of 0 from second switching level 4 is required, $S_2C_0$ is on and transistor 22 is turned on connecting $B_{15}$ to the input of inverter 34. If $B_{15}$ is at ground potential, transistor 32 is turned off. The ground potential $B_{15}$ bit is inverted by inverter 34 and applied to output $C_{15}$. Any other shift or rotate is accomplished in a like manner. For example, if second switching level is to provide a shift or rotate of 4, $S_2C_4$ is on and transistor 30 is turned on if $B_{19}$ is at ground potential. Inverter 34 inverts the ground potential to a positive potential which is applied to output $C_{15}$. The time at which the respective data bits are applied at the output $C_{15}$ is a function of the respective control signals.

Figure 6:
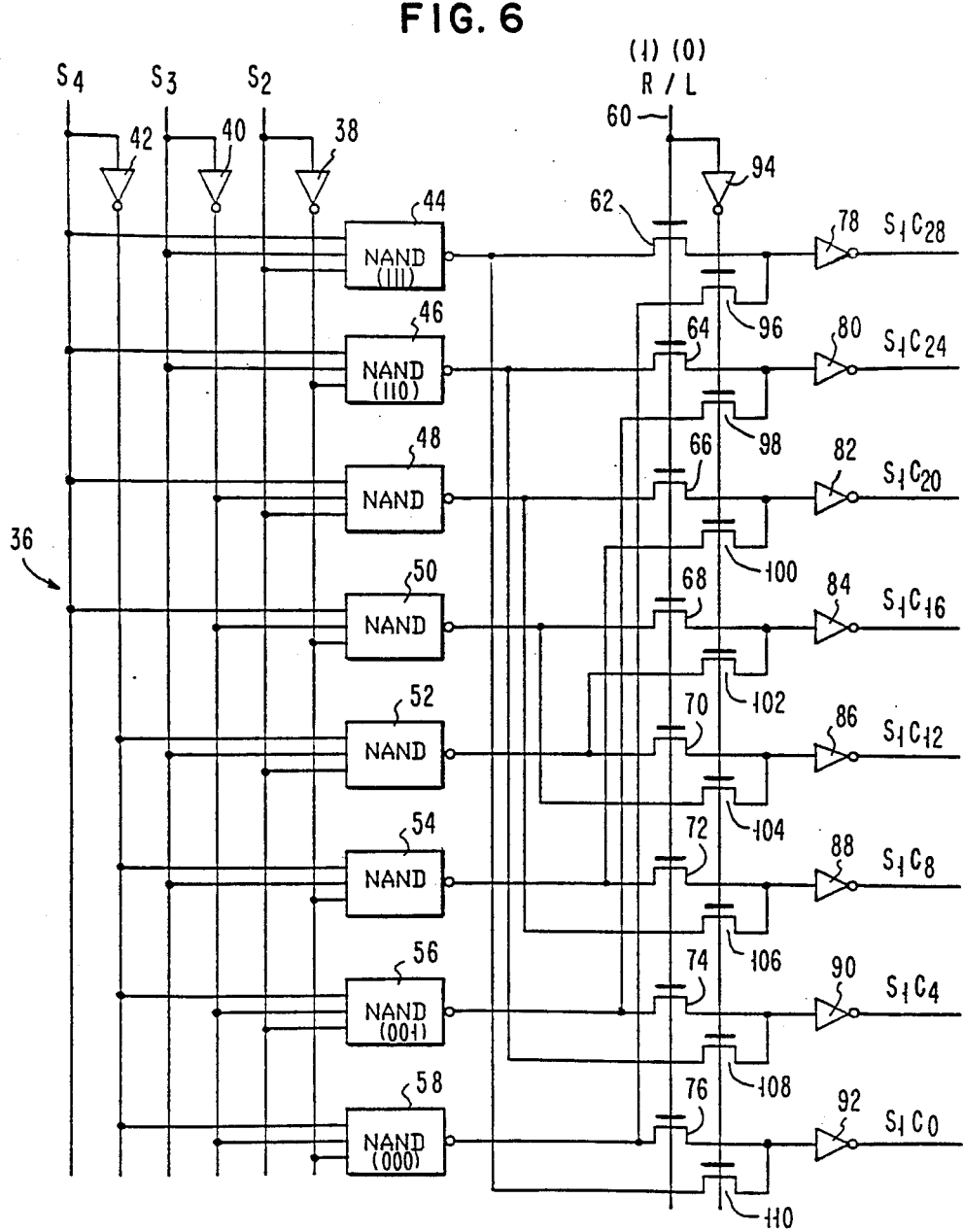
FIGS. 6 and 7 are block diagrams of a first and second level partial decoders, respectively.
Figure 7:
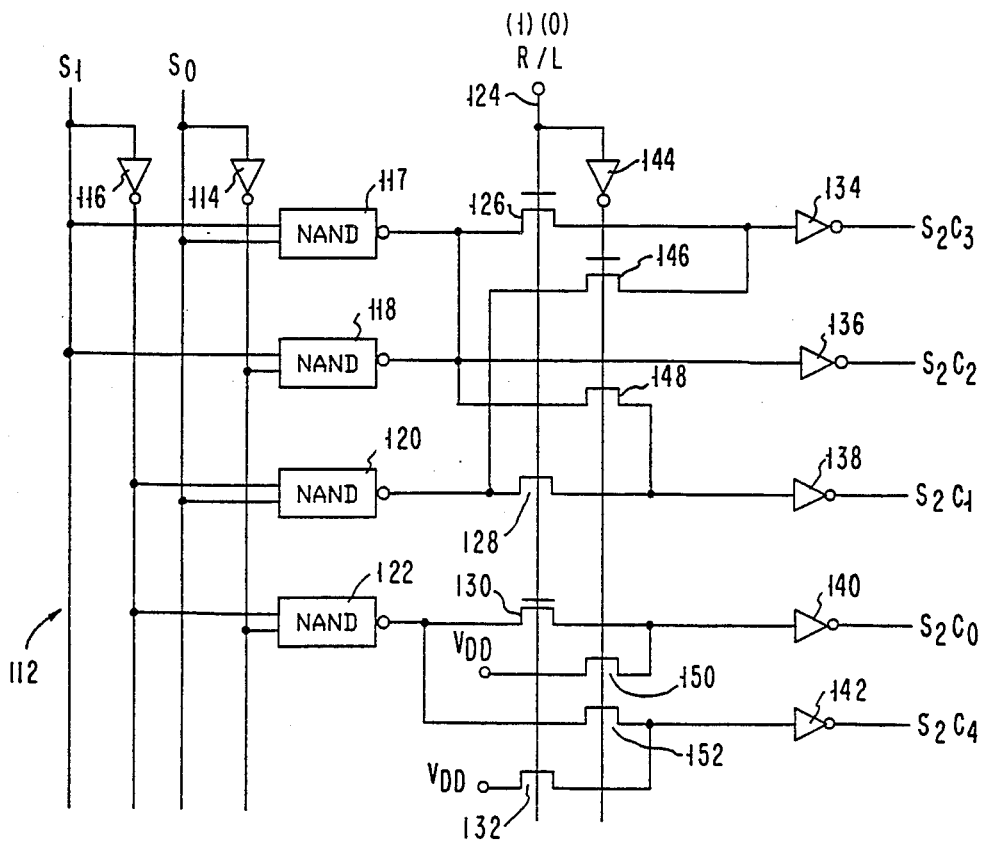

FIGS. 6 and 7 illustrate how scale factor signals $S_0$, $S_1$, $S_2$, $S_3$ and $S_4$ are partially decoded by first and second decoders to provide first and second groups of control signals for controlling the amount of shift or rotate in the first and second switching levels 2 and 4, respectively. The first decoder decodes scale factor signals $S_2$, $S_3$ and $S_4$ to provide the first set of control signals $S_1C_0$, $S_1C_4$, $S_1C_8$, $S_1C_{12}$, $S_1C_{16}$, $S_1C_{20}$, $S_1C_{24}$, and $S_1C_{28}$ for controlling the amount of shift or rotate in the first switching level 2. The second decoder decodes scale factor signals $S_0$ and $S_1$ to provide the secnd set of controls signals $S_2C_0$, $S_2C_1$, $S_2C_3$ and $S_2C_4$ for controlling the amount of shift or rotate in the second switching level 4. The total shift or rotate is the sum of the shift or rotate produced in the first and second switching levels. As previously stated, level 1 and level 2, could be reversed. In any event, the total amount of shift or rotate is the sume of the shift or rotate from each of the first and second switching levels.

FIG. 6 illustrates the first decoder 36 which partially decodes the scale factor signals by decoding $S_2$, $S_3$ and $S_4$. The complements of these signals are provided by inverters 38, 40 and 42, respectively. The $2^3 = 8$ possible codes produced by $S_2$, $S_3$ and $S_4$ are decoded by NAND gates 44, 46, 48, 50, 52, 54, 56 and 58. A right/left (R/L) bit determines if the shift or rotate is to the right or left.

If the R/L bit applied to line 60 is a "1", the shift is to the right, and this "1" is applied to the gate electrode of NMOS transistors 62, 64, 66, 68, 70, 72, 74 and 76. The source electrodes of these transistors are connected to the outputs of NAND gates 44, 46, 48, 50, 52, 54, 56 and 58, respectively. The drain electrodes of these transistors are connected to the inputs of inverters 78, 80, 82, 84, 86, 88, 90 and 92, respectively. The outputs of these inverters are the first group of control signals $S_1C_{28}$, $S_1C_{24}$, $S_1C_{20}$, $S_1C_{16}$, $S_1C_{12}$, $S_1C_8$, $S_1C_4$ and $S_1C_0$, respectively. Any NAND gate which as all of its inputs at a "1" provides a "0" out which is passed by its associated transistor, and which is inverted by the associated inverter to provide a "1" control signal. For example, when NAND gate 44 has all of its inputs at "1" which is indicative of $S_2$, $S_3$, $S_4$ being 111, respectively. A "0" out is passed by transistor 62 and inverted by inverter 78 to provide a "1" output which means $S_1C_{28}$ is "1" and a shift of 28 is to be performed by the first switching level 2. Likewise, when NAND gate 58 has all of its inputs at "1" which is indicative of $S_2$, $S_3$, $S_4$ being 000, respectively. A "0" out is passed by transistor 76 and inverted by inverter 92 to provide a "1" output which means $S_1C_0$ is a "1" and a shift of 0 is to be performed by the first switching level 2. All intermediate control signals are generated in a like manner.

If the R/L bit applied to line 60 is a "0", the shift is to the left. This "0" is inverted by inverter 94 and the resultant "1" is applied to the gate electrodes of NMOS transistors 96, 98, 100 102, 104, 106, 108 and 110. The source electrodes of these transistors are connected to the outputs NAND gates 58, 56, 54, 52, 50, 48, 46 and 44, respectively. The drain electrodes of these transistors are connected to the inputs of inverters 78, 80, 82, 84, 86, 88, 90 and 92, respectively. It is seen that $S_1C_{28}$ is now produced when all of the inputs of NAND gate 58 are "1" and that $S_1C_0$ is now produced when all of the inputs to NAND gate 44 are "1". This is the converse of the shift or rotate operation to the right. The intermediate stages operate in a like manner.

FIG. 7 illustrates the second decoder 112 which partially decodes the scale factor signals by decoding $S_0$ and $S_1$. The complements of these signals are provided by inverters 114 and 116, respectively. The codes produced by $S_0$ and $S_1$ are decoded by NAND gates 117, 118, 120 and 122. The R/L bit is applied to line 124. If the R/L bit is a "1", the shift is to the right, and the "1" is applied to the gate electrodes of NMOS transistors 126, 128, 130 and 132. The source electrodes of these transistors are connected to the outputs of NAND gates 117, 118, 120 and 122, respectively. The drain electrodes of these transistors are connected to the inputs of inverters 134, 136, 138, 140 and 142, respectively. The outputs of these inverters are the second group of control signals $S_2C_3$, $S_2C_2$, $S_2C_1$, and $S_2C_4$, respectively. Any NAND gate which has all of its inputs at a "1" provides a "0" out which is passed by its associated transistor, and which is inverted by the associated inverter to provide a "1" control signal. For example, when NAND gate 117 has all of its inputs at a "1", which is indicative of $S_0S_1$ being 11, respectively, a "0" out is passed by transistor 126 and inverted by transistor 134 to provide a "1" output which means $S_2C_3$ is a "1", and a shift of 3 is to be performed by the second switching level 4. Likewise, when NAND gate 118 has all of its inputs at "1" which is indicative of $S_0S_1$ being 01, respectively, a "0" is passed by transistor 118 and inverted by inverter 136 to provide a "1" output which means $S_2C_2$ is a "1" and a shift of 2 is to be performed by the second switching level 4. When NAND gate 120 has all of its inputs at a "1", which means $S_0S_1$ is at 10, respectively a "0" is passed by transistor 128 and inverted by inverter 138 to provide a "1" output which means $S_2C_1$ is a "1" and a shift of 1 is to be performed by the second switching level 4. If all of the inpus to NAND gate 122 are a "1", which means $S_0S_1$ is 00, respectively, a "0" is passed by transistor 130 and inverted by transistor 140 to provide a "1" output which means $S_2C_0$ is a "1" and a shift of 0 is to be performed by the second switching level 4. Transistor 132 passes the positive potential $V_{DD}$ to te input of 142, thus maintaining $S_2C_4$ at "0" at this time.

If the R/L bit applied to line 124 is a "0", the shift is to the left. This "0" is inverted by the invertr 144 and the resultant "1" is applied to the gate electrodes of NMOS transistors 146, 148, 150 and 152. The source electrodes of transistors 146 and 148 are connected to the outputs of NAND gates 120 and 117, respectively. The source electrode of transistor 150 is connected to $V_{DD}$. The drain electrodes of these transistors are connected to the inputs of inverters 134, 138 and 140, respectively. The left shift is the complement of the right shift, therefore $S_2C_3$ is produced from NAND gate 120 and $S_{C1}$ is produced from NAND gate 117. The inputs to these gates are complements. $S_2C_2$ is again produced by NAND gate 118, as the input to gate 118 is its own complement. The complement of 00, the input to NANd gate 122 is 100, which cannot be produced by any of the gates, therefore transistor 150 passes $V_{DD}$ to inverter 140 to maintain $S_2C_0$ at "0". The "0" output of NAND gate 122 is passed by transistor 152 and inverted by inverter 142 and $S_2C_4$ is a "1" and a shift of 4 is to be produced by the second switching level 4.

Having thus described our invention, what we claim as new, and desire to secure by Letters Patent is:

1. A circuit for one of shifting and rotating an input N-bit binary word, comprising:
   means for decoding n, where n is an integer, scale factor signals, including decoding the first through i, where i is an integer >2, scale factor signals to provide a first plurality of control signals indicative of a first amount of one of shift and rotate, and decoding and (i+1) through n scale factor signal to provide a second plurality of control signals indicative of a second amount of one of shift and rotate, with the amount of one of shift and rotate specified by said first and second plurality of control signals specifying the total amount of one of shift and rotate
   a first level of N switches for receiving said input N-bit binary word at N inputs thereof, with each such switch having >2 inputs connected to predetermined ones of said N inputs, and which are responsive to one of said first and second plurality of control signals for providing a first N-bit binary word at the output thereof which is said input N-bit binary word one of shifted and rotated by one of said first and second amounts; and
   a second level of N switches, for receiving said first N-bit binary word at N inputs thereof, with each such switch having >'inputs connected to predetermined one of said N inputs, and which are responsive to the other of said first and second plurality of control signals for providing an output N-bit binary word which is said first N-bit binary word one of shifted and rotated by the other of said first and second amounts.

2. A circuit for one of shifting and rotating an input N-bit binary word, comprising:

means for decoding n, where n is an integer scale factor signals, including decoding the first through i, where i is an integer >2, scale factor signals to provide $2^i$ controls signals indicative of one of a first amount of shift and rotate, and decoding the (i+1) through n scale factor signals to provide $2^{(n-i)}+1$ control signals indicative of a second amount of one of shift and rotate, with the amount of one of shift and rotate specified by said $2^i$ and $2^{(n-i)}+1$ control signals specifying the total amount of one of shift and rotate for said circuit; a first level of N switches for receiving said input N-bit binary word at N inputs thereof, with each such switch having $2^i$ inputs connected to predetermined ones of said N inputs, and which are responsive to said $2^i$ control signals for providing the first N-bit binary word at the output thereof which is said input N-bit binary word one of shifted and rotated by said first amount; and a second level of N switches, for receiving said first N-bit binary word at N inputs thereof, with each such switch having $2^{(n-i)}+1$ inputs connected to predetermined one of said N inputs, and which are responsive to said $2^{(n-i)}+1$ control signals for providing an output N-bit binary word which is said first N-bit binary word one of shifted and rotated by said second amount.

3. A circuit for one of shifting and rotating an input N bit binary data word, comprising:

means for decoding n, where n is an integer, scale factor signals, including decoding the first through ith, where i is an integer >2, scale factor signals to provide a first plurality of $2^i$ control signals, with each such control signal being indicative of a first increment of one of shift and rotate, and decoding the (i+1) through n scale factor signals to provide a second plurality of $2^{(n-i)}+1$ control signals, with each such control signal being indicative of a second increment of one of shift and rotate, with the first and second increments of one of shift and rotate specified by said first and second plurality of control signals specifying the total increment of one of shift and rotate for said circuit:

a first level of N switches connected between N inputs for receiving said input N bit data word, and N outputs, with each such switch having $2^i$ data inputs connected to predetermined ones of said N inputs, and $2^i$ control inputs and a single data output, with each of said $2^i$ control signals selecting a different one of said $2^i$ data inputs for provision to the output of each such switch, with said first level of N switches providing a first N bit data word at the outputs thereof which is said input N bit data word one of shifted and rotated by said first increment; and a second level of N switches connected between said N inputs for receiving said first N bit data word, and said N outputs, with each such switch having $2^{(n-i)}+1$ data inputs connected to predetermined ones of said N inputs, and $2^{(n-i)}+1$ control inputs and a single data output, with each of said $2^{(n-i)}+1$ control signals selecting a different one of said $2^{(n-i)}+1$ data inputs for provision to the output of each such switch, with said second level of N switches providing a second N bit data word at the outputs thereof which is said first N bit data word one of shifted and rotated by said second increment.

4. A circuit for one of shifting and rotating an input N bit binary data word comprising:

means for decoding n, where n is an integer, scale factor signals, including decoding the first through i, where i is an integer >2, scale factor signals to provide a first plurality of $2^i$ control signals, with each such control signals being indicative of a first increment of one of shift and rotate, and decoding the (i+1) through n scale factor signals to provide a second plurality of $2^{(n-i)}+1$ control signals, with each such control signal being indicative of a second increment of one of shift and rotate, with the first and second increments of one of shift and rotate specified by said first and second plurality of control signals specifying the total increment of one of shift and rotate for said circuit;

a first level of N switches connected between N inputs for receiving said input N bit data word, and N outputs, which each such switch having $2^{(n-i)}+1$ data inputs connected to predetermined ones of said N inputs, and $2^{(n-i)}+1$ control inputs and a single data output, with each of said $2^{(n-i)}+1$ control signals selecting a different one of said $2^{(n-i)}+1$ data inputs for provision to the output of each such switch, with said first level of N switches providing a first N bit data word at the output thereof which is said input N bit data word one of shifted and rotated by said first increment; and a second level of N switches connected between said N inputs for receiving said first N bit data word, and said N outputs, with each such switch having $2^i$ data inputs connected to predetermined one of said N inputs, and $2^i$ control inputs and a single data output, with each of said $2^i$ control signals selecting a different one of said $2^i$ data inputs for provision to the output of each such switch, with said second level of N switches providing a second N bit data word at the output thereof which is said first N bit data word one of shifted and rotated by said second increment.

5. A circuit for one of shifting and rotating an input N-bit binary data word, comprising:

means for decoding n, where n is an integer substantially equal to log N, scale factor signals, including first and second decoders, with the first decoder decoding the first through i, where i is an integer >2, scale factor signals to provide a first plurality of $2^i$ control signals, with each such control signal being indicative of a first increment of one of shift and rotate, with the second decoder decoding the (i+1) through n scale factor signals to provide a second plurality of $2^{(n-i)}+1$ control signals, with each such control signal being indicative of a second increment of one of shift and rotate, with the first and second increments of one of shift and rotate specified by said first and second plurality of control signals specifying the total increment of one of shift and rotate for said circuit;

a first switching level having N inputs for receiving said input N-bit data word, and N outputs, and including N switches connected between said N inputs and said N outputs, with each such switch having $2^i$ data inpus and $2^i$ control inputs and a single data output, with each of said $2^i$ control signals selecting a different one of said $2^i$ data inputs for providion to the output of each such switch, with the first of said $2^i$ data inputs of each switch being connected to a predetermined one of said N data inputs of said first switching level and the remaining of the $2^i$ data inputs of each such switch being connected to data inputs of said first switching level which are displaced from said predetermined one of said N data inputs, and from each other by a first predetermined number of bit positions, with said first switching level providing a first N-bit data word at the outputs thereof which is said input N-bit data word one of shifted and rotated by said first increment; and a second switching level having N inputs for receiving said first N-bit data word, and N outputs and including N switches connected between said N inputs and said N outputs, with each such switch having $2^{(n-i)}+1$ data inputs and $2^{(n-i)}+1$ control inputs and a single data output, with each of said $2^{(n-i)}+1$ control signals selecting a different one of said $2^{(n-i)}+1$ data inputs for provision to the output of each such switch, with the first of said $2^{(n-i)}+1$ data inputs of each switch being connected to a predetermined one of said N data inputs of said second switching level and the remaining of the $2^{(n-i)}+1$ data inputs of each such switch being connected to data inputs of said second switching level which are displaced from sad predetermined one of said N data inputs and from each other by a second predetermined number of bit positions, with said second switching level providing a second N-bit data word at the outputs thereof which is said first N-bit data word one of shifted and rotated by said second increment.

6. The combination claimed in claim 5 including means in said first and second decoders to specify a change in the direction of one of shift and rotate.

* * * * *